Aug. 6, 1940.  E. L. ROSE ET AL  2,210,130
POWER TRANSMISSION
Filed Feb. 27, 1937  2 Sheets-Sheet 2
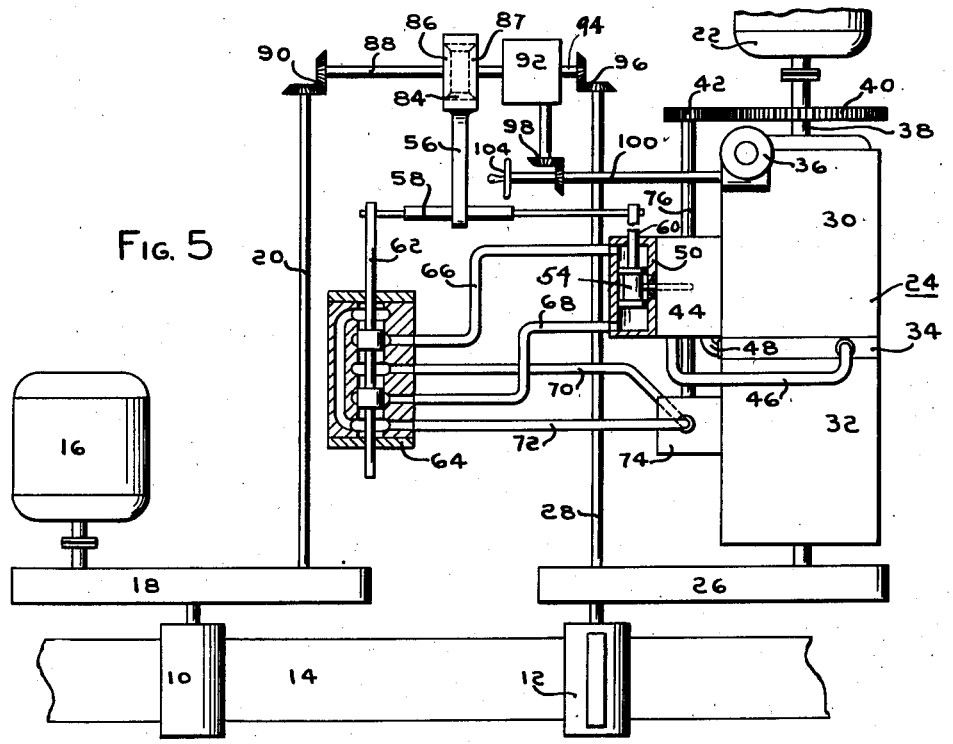
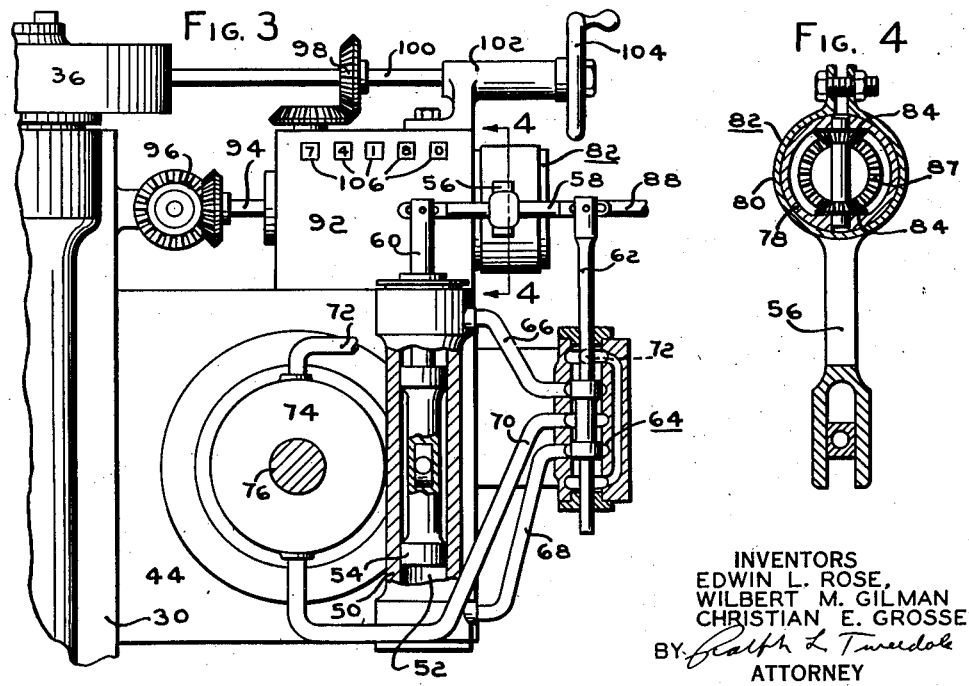
INVENTORS
EDWIN L. ROSE,
WILBERT M. GILMAN &
CHRISTIAN E. GROSSER
BY Ralph L. Tweedale
ATTORNEY Patented Aug. 6, 1940

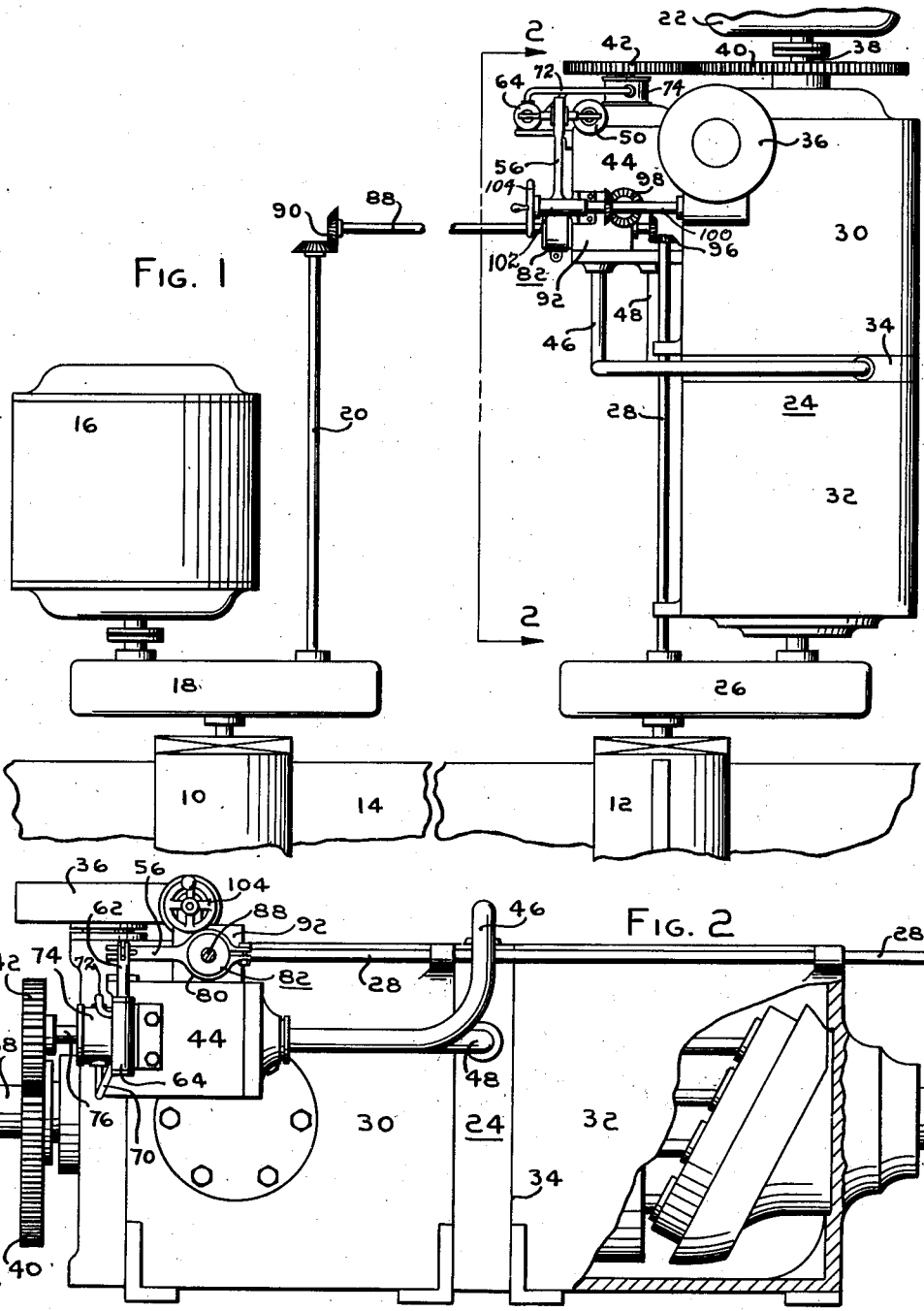

2,210,130

UNITED STATES PATENT OFFICE 2,210,130

POWER TRANSMISSION

Edwin L. Rose and Wilbert M. Gilman, Watertown, and Christian E. Grosser, Waterbury, Conn., assignors to The Waterbury Tool Company, Waterbury, Conn., a corporation of Connecticut Application February 27, 1937, Serial No. 128,184

3 Claims. (Cl. 60—53)

This invention relates to power transmissions and more particularly to those of the type comprising two or more fluid pressure energy translating devices one of which may function as a pump and another as a fluid motor. Transmissions of this character while providing an infinite number of speed ratios between the driving and driven ends, that is while they provide an absolutely stepless change in speed ratio, do not provide a completely positive drive through the transmission and are subject to small variations in speed ratio at any particular setting. These variations are caused by a number of factors, among them the oil temperature and viscosity, working pressure and normal wear. For most applications the effect of such variations is negligible. In other applications it is desirable to provide the greatest possible accuracy of ratio setting.

One situation where such a requirement is met is in the driving of the flying shear in a continuous strip rolling mill, where the speed ratio between the flying shear and the last finishing roll determines the distance between successive cuts by the shear. While hydraulic variable speed transmissions are successfully being used in this service today, the control of the speed ratio is accomplished by a trial and error method of hand adjustment each time the speed ratio setting is changed for cutting the strip to a different length. Likewise, it is necessary to constantly check this setting and correct for deviations from the desired length of finished stock as they occur.

It is an object of the present invention to provide a variable speed hydraulic transmission system wherein automatic means is provided for continuously measuring and correcting for any deviations from the desired speed ratio of the transmission.

A further object is to provide a transmission system of the character described wherein a pilot transmission has its input end connected to be driven at a controlled speed and its output end connected to the driven member of the main transmission and to provide means operated from the pilot transmission for controlling the speed ratio setting of the main transmission.

Further objects and advantages of the present invention will be apparent from the following description, reference being had to the accompanying drawings wherein a preferred form of the present invention is clearly shown.

In the drawings:

Fig. 1 is a plan view of a portion of a rolling mill incorporating a transmission system embodying a preferred form of the present invention.

Fig. 2 is a cross section on line 2—2 of Fig. 1.

Fig. 3 is a fragmentary end view partly in section showing a portion of the control mechanism.

Fig. 4 is a cross section on line 4—4 of Fig. 3.

Fig. 5 is a diagrammatic view of the mechanism.

Referring now to Fig. 1 there is illustrated a portion of a continuous strip steel mill exemplifying one type of sectional machine to which the present invention is particularly adapted. 10 represents the last finishing roll stand of the mill while a flying shear of conventional construction is indicated at 12, the strip steel 14 being fed from the roll stand 10 to the shear 12 where it is cut in lengths as desired. The length of strip cut is, of course, determined by the ratio between the linear speed of the roll surfaces 10 and the linear speed of the shear blades 12. It is therefore necessary not only to provide means for varying the speed ratio between the roll stand 10 and the shear 12 in order to be able to cut the sheet to any lengths desired but it is also necessary that with a given speed ratio setting the ratio must not deviate if close tolerances in the length of successively cut sheets is to be maintained.

The roll stand 10 is driven from an electric motor 16 through suitable reduction gearing 18 having an auxiliary shaft connection at 20 for a purpose later to be described. The flying shear 12 is driven from an electric motor 22 through a hydraulic variable speed power transmission 24 and reduction gearing 26, the latter also having an auxiliary shaft connection at 28. The transmission 24 may be of any suitable construction, the one illustrated being of the well-known "Waterbury" construction comprising a variable displacement pump 30 and a fixed displacement fluid motor 32, connected together by arcuate conduits in a valve plate 34.

The speed ratio of the transmission may be controlled through a worm gear control head 36 which operates on the control shaft of the pump 30 in a manner well known to those skilled in the art. The drive shaft 38 of the pump 30 carries a gear 40 which meshes wtih a gear 42 connected to the drive shaft 76 of a second, smaller variable displacement pump 44 which may be of similar construction to the pump 30. The supply and return conduits 46 and 48 of the pump 44 are connected to the corresponding conduits in the valve plate 34 of the transmission 24. The pumps 30 and 44 are thus connected in parallel to operate the motor 32; providing a variable speed transmission in which the speed ratio may be controlled both by varying the displacement of the pump 30 and by varying the displacement of the pump 44. The pump 30 provides a coarse adjustment while the pump 44 provides a finer adjustment in either direction from any given setting of the pump 30.

The pump 44 has a displacement regulator 50 which comprises a cylinder 52 having a double acting piston 54 therein. The displacement regulator 50 is under the control of an arm 56 (see Fig. 4) which is universally pivoted to a floating lever 58 having one end connected to a stem 60 projecting from the piston 54 and the other end connected to a stem 62 of a pilot valve 64. The valve 64 controls connections 66 and 68 between the opposite ends of the cylinder 52 and a return conduit 70 and pressure conduit 72 connected to an auxiliary pump 74, preferably of the gear type provided with a relief valve and connected to a drive shaft 76 of the pump 44. The floating lever 58, pilot valve 64, and piston 54 form a follow-up servo-motor of well-known construction for enabling the arm 56 to control the displacement regulator 50 with a minimum of effort as is well known in the art.

The arm 56 is connected to a drum 78 by a brake band 80 formed on the arm 56 and which provides a yielding slip clutch 82 to prevent damage to the mechanism in the event of breakage of other parts of the mechanism. The drum 78 carries a pair of bevel pinions 84 which mesh with a pair of bevel gears 86 and 87 on opposite sides thereof to form a differential gearing. One of the bevel gears 86 is connected to a shaft 88 which is driven through miter gearing 90 from the shaft connection 20 of the reduction gear 18. The other bevel gear 87 is connected to one shaft of a pilot transmission 92 coaxial with the shaft 88. The transmission 92 has its other shaft 94 connected by bevel gearing 96 with the auxiliary shaft connection 28 of the reduction gear 26. The transmission 92 may be of any construction which provides a large number of positive driving gear ratios which may be controlled progressively from a rotating shaft. One example of a transmission suitable for this purpose is disclosed in the patent to Edwin L. Rowe and Ralph L. Tweedale, Number 2,168,656, issued August 8, 1939. There are obviously many other forms of change speed gear box transmissions which may be utilized for this purpose. The only essential requirement is that the gear provide enough speed ratio changes to correspond to the number of different lengths to which the strip material is desired to be cut.

In the present embodiment the transmission 92 is illustrated as having a rotary control shaft operable from bevel gearing 98 which is connected to a shaft 100 journalled in a bearing 102 and having a hand wheel 104 at one end and having its other end connected to the worm of the control head 36 of the transmission 30. The speed ratio of the control head 36 is such that rotation of the shaft 100 produces the same change in overall ratio through the transmission 24 as is produced through the pilot transmission 92. Dials 106 are preferably provided in the transmission 92 to indicate the setting thereof. It will be understood, however, that the transmissions 24 and 92 may be arranged without the simultaneous control feature.

In operation the roll stand 10 is driven from the electric motor 16 through the reduction gearing 18 while the shear 12 is driven from the motor 22 through the hydraulic transmission 24 and reduction gearing 26. The electric motors 16 and 22 need not be electrically synchronized but may have significant independent speed variations such as would occur with induction motors, for example, under independent load variations. Assuming the hand wheel 104 to have been set to provide a speed ratio through the transmission 24 and through the pilot transmission 92 such that the sheet is cut to one desired length it will be seen that the arm 56 will remain stationary so long as the ratio through the transmission 24 corresponds to the ratio through the transmission 92. The shaft 88 and bevel gear 86 are connected to rotate at a speed proportional to the speed of the finishing rolls 10 thru the medium of the shaft 20 and bevel gears 90. The bevel gear 87 is connected to rotate at a speed proportional to the speed of the shear 12 through the medium of shaft 28, gears 96, shaft 94 and transmission 92. Although this proportion may be varied by operation of the handwheel 104 it will be understood the latter is never moved except when it is desired to change the length of sheet to be cut. The bevel gear 86 turns in the opposite direction to the bevel gear 87 so that as long as the speeds of the two bevel gears are equal, the drum 78 will remain stationary. The shaft 20, bevel gear 90, shaft 88, bevel gear 86, pinions 84, bevel gear 87, transmission 92, gearing 96 and shaft 28, thus constitute a positive connection between the rolls 10 and shear 12. This connection is yieldable, however, but can yield only by moving the drum 78 and arm 56 either up or down depending on whether the shear speeds up or slows down relative to the finishing rolls. Starting with the displacement regulator 50 in neutral position so that the pump 44 is delivering no fluid whatever to the valve plate 34, it will be seen that should the speed of the shear 12 deviate from the speed ratio which would be produced if the drive were transmitted from the roll stand 10 through shafts 20 and 88, pilot transmission 92, and shaft 28 to the shear 12; then the only thing which can move to permit such a departure in speed is the drum 78 and arm 56. Assuming the shear to slow down slightly the arm 56 will be moved downwardly in Fig. 4 operating the displacement regulator 50 to move the pump 44 into stroke in a direction tending to deliver fluid in the same direction which the pump 30 delivers fluid to the motor 32. The motor 32 thus tends to speed up until the speed of the shear 12 is again equal to what it would be were the drive transmitted from roll stand 10 through the pilot transmission 92.

Should the shear 12 tend to speed up, the arm 56 moves upwardly either decreasing the stroke of the pump 44 in a forward direction or, if necessary, moving the regulator 50 beyond neutral into reverse stroke so that the pump 44 subtracts from the output of the pump 30. It will thus be seen that the shear 12 is constantly driven at the same speed which it would be were the power transmitted through pilot transmission 92 and that the control arm 56 operates to maintain this speed regardless of whether the tendency to depart therefrom is due to slippage in the transmission 24 or to slippage in the electric motor 22.

Operation of the control wheel 104 changes the ratio in the pilot transmission 92 and at the same time correspondingly changes the setting of the pump 30 so that the range of corrective operation available through the pump 44 is maintained the same regardless of the ratio setting of the transmission 92. In other words when the setting of the transmission 92 is changed the setting of the pump 30 is correspondingly changed so that if there were no slippage either in the motor 22 or in the transmission 24, the pump 44 would always operate at neutral position. In this manner there is provided an equal range in both directions from neutral position of the pump 44 for all settings of the pilot transmission 92.

While the form of embodiment of the invention as herein disclosed, constitutes a preferred form, it is to be understood that other forms might be adopted, all coming within the scope of the claims which follow.

What is claimed is as follows:

1. In a variable speed power transmission system the combination of a large variable displacement pump, a small variable displacement pump, a fluid motor, supply and return conduits connecting said pumps in parallel with said motor to form a variable speed power transmission, driving means for said pumps, a driven element connected to said motor, a pilot variable ratio transmission, means connecting the pilot transmission between a driving member operable at predetermined speed and said driven element, and means operable when the ratio between said driving member and said driven element tends to depart from the ratio at which said pilot transmission is adjusted, for varying the displacement of the small variable displacement pump.

2. In a variable speed power transmission system the combination of a large variable displacement pump, a small variable displacement pump, a fluid motor, supply and return conduits connecting said pumps in parallel with said motor to form a variable speed power transmission, driving means for said pumps, a driven element connected to said motor, a pilot variable ratio transmission, means connecting the pilot transmisison between a driving member operable at predetermined speed and said driven element, means operable when the ratio between said driving member and said driven element tends to depart from the ratio at which said pilot transmission is adjusted, for varying the displacement of the small variable displacement pump, and common means for adjusting the displacement of the large pump and the ratio setting of the pilot transmission.

3. In a drive for a sectional machine the combination of a main variable speed hydraulic transmission of the infinitely variable, non-positive ratio type having its output end connected to one section of the machine, a pilot transmission comprising a multiple ratio spur gear set having a finite number of positive invariable ratio settings and capable of transmitting only sufficient power to control the ratio setting of the main transmission, a driving connection between one end of the pilot transmission and said one section of the machine, means for driving the other end of the pilot transmission at a controlled angular speed, and means responsive to variations in angular phase relation between said one section of the machine and the said driving means for changing the ratio setting of the main transmission to restore said angular phase relation.

EDWIN L. ROSE.
WILBERT M. GILMAN.
CHRISTIAN E. GROSSER.